1

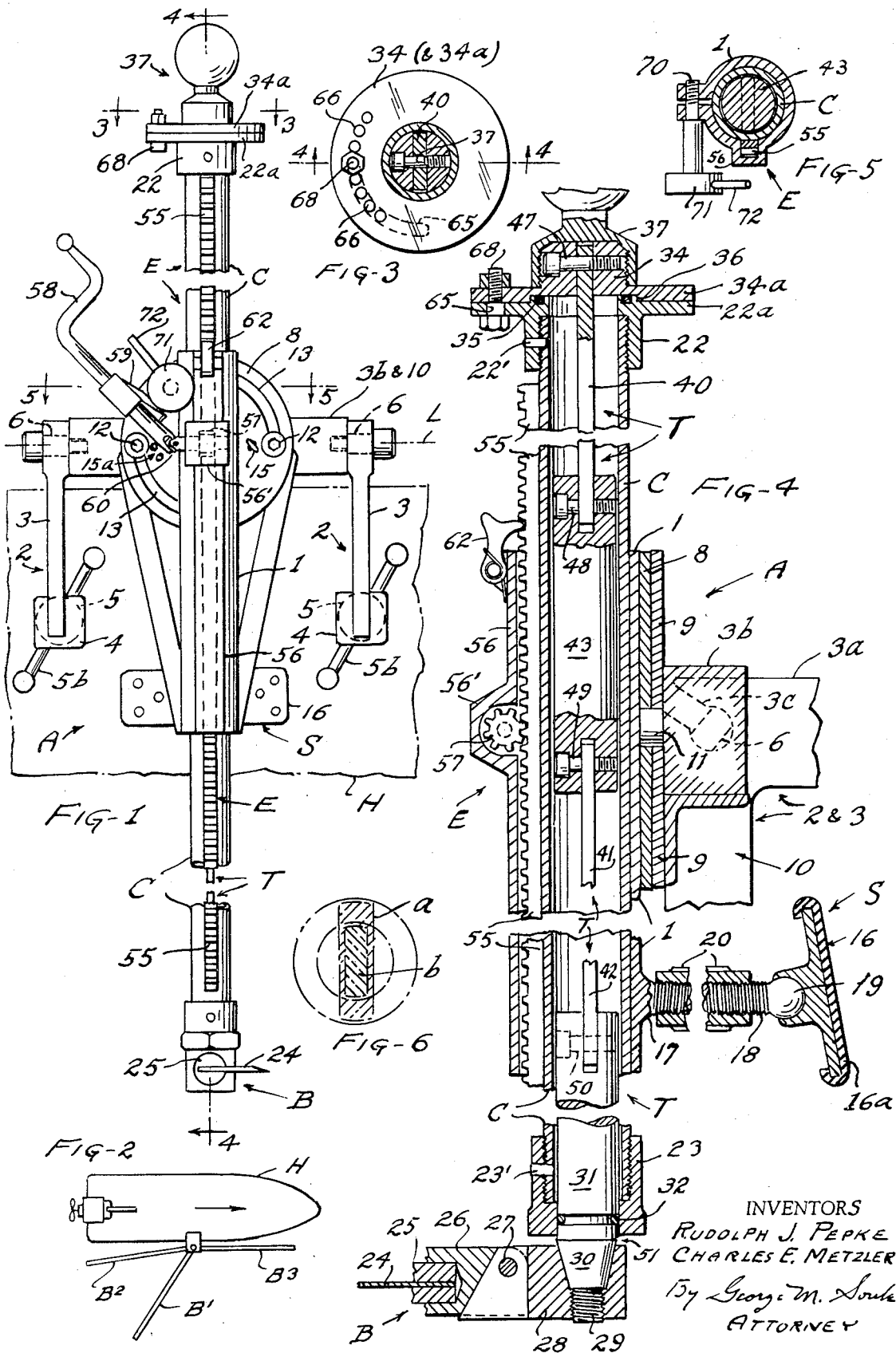
July 14, 1970     R. J. PEPKE ET AL     3,520,117
UNDERWATER WEED CUTTER MECHANISMS
Filed Nov. 30, 1967
INVENTORS
RUDOLPH J. PEPKE
CHARLES E. METZLER
By George M. Soule
ATTORNEY United States Patent Office 3,520,117
Patented July 14, 1970

3,520,117
UNDERWATER WEED CUTTER MECHANISMS
Rudolph J. Pepke, Cleveland, and Charles E. Metzler,
Avon, Ohio, assignors to R-C Water Weeder Company,
Inc., Cleveland, Ohio, a corporation of Ohio
Continuation-in-part of application Ser. No. 538,491,
Mar. 24, 1966. This application Nov. 30, 1967, Ser.
No. 692,619
Int. Cl. A01d 45/08
U.S. Cl. 56—8                                 11 Claims

ABSTRACT OF THE DISCLOSURE

An underwater, weed cutting unit wherein the scythe-type cutter blade, during weed-cutting operations thereof incident to forward movement of a supporting boat, is held in cutting position by a torque rod-type supporting shaft in a tubular casing mounted in normally fixed upright position on the boat hull. The supporting shaft has a plurality of torsionally rigid sections and interposed leaf spring-like, twistably flexible sections designed for strong torque spring reactance to the cutting operation. Suitable adjustment means enables the cutter blade to project from a lower end portion of the supporting shaft at or into whatever angular positions, as about a vertical axis, are or may be found to be most effectual in respect to the particular weed growths, depths or other variables that are encountered. The cutter blade is raised and lowered by a rack and pinion mechanism; and the rack is manually releasable via a pawl biased to engage the rack. An adjustable jacking device, as between the tubular casing and the boat hull, enables the cutter blade to be disposed selectively at whatever angles, relative to a "normal" horizontal position of the blade are necessary in order to cut growths lying adjacent sloping shore surfaces, at approximately uniform heights.

---

This application is a continuation-in-part of application Ser. No. 538,491, filed Mar. 24, 1966, and now abandoned.

The present subject invention has the same general objects as does that of our above-identified earlier filed application to which reference is directed for a more complete discussion of the problems involved than appears appropriate in this specification.

OBJECTS AND PROBLEMS

In any operation of cutting submerged weed growths while using a scythe-type cutter blade it is important to be able to adjust cutting depths positively and quickly, partly in order to avoid leaving uncut vegetation unnecessarily high, and additionally, in order to avoid likelihood of damage to the cutter blade in critical working area.

Also it is highly desirable to be able approximately to mate, by the cutting operations, the topography of the areas to be cleared—or, in other words, to effect approximately uniform depths of cutting in accordance with variations in slope of the shore bottoms.

Additionally it is desirable to enable the cutter blade equipment to yield more or less completely under excessively high load—even though such yielding may or will result in cutting narrower or less wide swaths until the excessive load is dissipated, since such unpredictably high load may be a stone, post or stump, which usually could not be cut or pushed aside by the cutter blade.

The cutter unit should also enable the cutter blade to move very freely in a direction reversely of the normal boat movement, as when the boat is driven in reverse; should then return automatically to cutting position; and should enable adjustment of the initial cutting angle (as horizontally) through an appropriately wide range.

The herewith disclosed underwater weed-cutter mechanism meets all of the above desiderata in a highly economical manner, as will be more fully explained below.

DESCRIPTION

In the accompanying drawing, FIG. 1 is a side view of the present subject weed cutter unit as mounted, e.g., on a starboard portion of a power boat or other watercraft.

FIG. 2 is a diagrammatic small scale plan view of a power boat carrying the present weed cutter unit.

FIGS. 3 and 5 are relatively enlarged, transverse, detail sectional views taken as indicated at 3—3 and 5—5 respectively on FIG. 1.

FIG. 4 is a further enlarged fragmentary assembly view taken as indicated at 4—4 on FIG. 1.

FIG. 6 is a diagram more or less in the nature of two combined transverse cross sectional views, comparing two designs of torque rod-type springs, as will be explained.

Weed cutter unit or assembly A, FIGS. 1, 2 and 3, has a main or outer tubular body or casing 1 (containing an inner, longer, case or tube C described later). The casing assembly 1, C is adapted to be mounted in approximately upright position on a boat hull H, FIGS. 1 and 2, as by a clamping and mounting mechanism unit 2, partially shown. Mounting unit 2 hereof has a pair of L-shaped brackets 3 (one partially shown in FIG. 4) equipped with pads 4 (FIG. 1 only) for frictional clamping engagement with outer surface gunwale portions of various designs of power boats, and cooperating pads 5 on clamp screw assemblies, not shown, mounted on the L-shaped brackets 3 for clamping engagement with inner gunwale surface portions. The movable clamping member supports (not shown hereby) are quickly adjustable along respective horizontal rail portions 3a (see FIG. 4; one shown) of the L-shaped brackets 3. The clamp screw assemblies (indicated herein only by operating-screw handle 5b, FIG. 1) are self locking in adjusted positions on respective rail portions 3a. Thereby the clamping assembly accommodates, quickly, a great variety of boat hull gunwale designs and dimensions.

For identification and reference later herein, the cutter blade assembly B, FIGS. 1 and 4, is supported on the lower end of a torque shaft assembly T (described later) contained loosely in the inner case or tube C which is adjustably slidable in the tubular base tube or body 1, principally in order to enable variation in the cutting depth of the blade assembly B, as will be further described below.

The entire cutter unit A has a trunnion-type mounting on the clamp assembly L-shaped brackets 3. The mounting includes partially flattened portions of the shanks of screws 6, FIGS. 1 and 4, in heavy cross frame member 3b and key hole-shaped openings 3c, the arrangement permitting the unit A to be swung bodily inwardly about a horizontal fore-and-aft axis L, FIG. 1. In a generally recumbent position only, the unit A can be detached from the mounting and clamping assembly, for inboard storage of unit A for example, all as explained in said prior application.

The herewith partially illustrated cutter unit mounting assembly (FIGS. 1 and 4) further includes mutually overlapping circular plates 8 and 9 rigid with casing 1 and a rigid framework 10 respectively, the plates being pivotally interconnected as about a horizontal pintle 11, FIG. 4, extending transverse to the forward direction of boat movement; and a pair of nonclamping screws 12 respectively occupying arcuate slots 13 in the plate 8 and suitable threaded openings (not shown) in plate 9. As more fully shown in said prior application, the pivotal movement of the unit 1 about pintle 11 is normally prevented by a readily replaceable shear pin 15 (e.g., cotter pin) occupying a selected one of several "pairs" of openings (in positions such as indicated at 15a, FIG. 1) through the plates 8 and 9 whereby the angular relationship of unit A and the boat hull in a vertical plane can be adjusted. If, for example, any submerged portion of the tubular case C, or any of the mounting members of the blade assembly B, encounters a strongly resistant submerged object (e.g., a stump, spile or deeply embedded rock), damage to the cutter unit A will be obviated via rupture of the shear pin 15.

The cutter unit A is stabilized in working position by suitable means including a strut assembly S, FIGS. 1 and 4. That assembly has a pad device 16 of suitable design, having for example, a water- and wear-resistant, nonmetallic facing portion 16a, for lateral abutment with an associated external surface of the boat hull. As shown by FIG. 4 particularly, the pad device 16 is supported by a screw-threaded stem or projection 17 rigid with the tubular base or casing member 1, below the trunnion connection 6, etc., thereof with the clamp assembly 2, 3; and a similar, but oppositely screw-threaded stem or rod 18 having a ball-joint or equivalent "universal" connection 19 with the pad device 16. An internally threaded sleeve 20 adjustably couples the stem portions 17 and 18 together to permit the pad device 16 to be extended toward and away from the base casing 1 through a considerable distance range (e.g., from six inches to twelve inches, or other desired amount). Thereby the cutter blade assembly B can easily be tilted for operation into a fairly large variety of working planes. Thus, assuming the general slope or topography of a weed-overgrown normally submerged shore area has been determined, as by probing or wading, the operating position of the blade assembly B can then be tilted and set to accomplish cutting at the most effective and safe angular position of the blade assembly relative to the shore bottom.

The inner tubular case C for torque spring shaft assembly T (see FIG. 4), includes top and bottom tubular collars 22 and 23 respectively, screw-threaded or otherwise firmly secured to associated end portions of the tube C as clearly shown in FIG. 4, and preferably set-screw held or pinned in place as at 22' and 23' (or by welding or the like) to prevent or deter dislocation of the collars by unauthorized curious persons. Flange 22a of collar 22 must (as by pin 22') be prevented from angular dislocation about the longitudinal axis of tube C, since it has to serve as a base for initial setting of the blade assembly B at an efficient or desirable cutting angle relative to said axis. The most desirable angle depends upon the expected conditions of the growths to be cut. The tougher (e.g., more fibrous, woody or "dead") the growths are the more the blade needs to be inclined toward trailing positions.

The cutter blade assembly B preferably comprises a thin forwardly sharpened blade member 24 of very high quality, tough and rust-resistant steel and a blade shank or backing rod or bar member 25 therefor coextensive with the blade and clamped as by screws (as shown in said application but not herein) in a head member 26. The member 26 is hinged via a cross pin 27 to a mounting piece 28 secured, as by left hand, hence self-tightening, screw threads 29, to a downwardly projecting tapered portion 30 of a lower torsionally rigid rod member 31 of the torque shaft assembly T.

All portions of torque shaft assembly T may be loosely journalled in the tube C for free guidance thereby radially thereof, as shown somewhat exaggeratedly in FIG. 4. To exclude water from tube C the lower rod member 31 has, as shown, sealing means such as an O-ring 32 in a groove around the rod member 31.

At the top of the torque shaft assembly or unit T (see FIG. 4) a cap piece 34 has a circular flange 34a, integral therewith, overlying and preferably coextensive with flange 22a of threaded collar 22. A water-excluding seal 35 is shown in FIG. 4 adjacent a pilot and/or labyrinth joint 36 between the members 22 and 34. A cap assembly 37 (construction evident in FIG. 4) surmounts the flanged cap piece 34, screw threaded thereto, as shown.

The torque spring assembly T, as shown principally by FIG. 4, comprises a suitable number (for instance three or four, depending upon the length of the tube C) of generally flat, leaf spring-form torsion rod elements 40, 41 and 42, and interconnecting torsionally rigid rod member (as at 43, FIG. 4). In one very satisfactory design, wherein the assembly comprising tube C and its associated end members has a total length of approximately five feet, the torque spring elements 40, 41 and 42 are each about one foot long (effective spring length thus being about 10 inches each), and their transverse dimensions are 5/16 inch by 1¼ inch. The three nonflexible members (31, 34 and 43, FIG. 4, as illustrated) are interconnected with the torsionally flexible members as by screws (e.g., 47, 48, 49, 50, etc., depending upon the total number of sections required), as evident from the drawing. The interconnectors as well as the torsionally flexible sections have appropriate working clearance within the tube C, somewhat exaggeratedly illustrated in FIGS. 4 and 5, in order to preserve substantial alignment of the members while allowing working freedom. Considerable axial clearance is provided at one end of the assembly (as at 51, lower part of FIG. 4), since the torque spring assembly becomes shorter during flexure out of normal position, or such as illustrated in FIG. 4. The rigid and flexible portions of the torque rod and shaft assembly T are appropriately lubricated (for instance grease packed during installation or provided with grease fittings, not shown).

If variation or adjustment of the torque value of shaft assembly T is desired, the flexible members 40, 41 and 42 can be substituted for or replaced by similar members which are thicker, hence stiffer, between their end portions which receive the connection screws 47, 48, etc. Alternatively, for example, as shown in said pending application but not herein, auxiliary spring means can be connected between the tube C and shaft assembly T, for action in parallel therewith, being suitably adjustable in appropriate manner.

Comparative tests have shown that there is a surprising difference between leaf spring-like torque rod springs comprising one long strip of spring stock as against several section of spring stock of similar cross section in series with each other and suitably interconnected for guidance as shown for example in FIG. 4. FIG. 6 shows, at a and b respectively, tested design proportions, when (as at a) a single approximately five feet long leaf spring-type torque rod is employed, and when (as at b) sectional torque rod members of the same metallurgical characteristics (per present application) are employed in obtaining nearly equivalent torque values. If a single-piece torque rod member (as at a, FIG. 6) were to be used, then the assembly including the necessary housing, etc., would have roughly twice the bulk and mass of the presently-illustrated assembly. The relatively short leaf spring sections 40, 41 and 42, of small cross section, as at b, FIG. 6, accomplishes the necessarily powerful torque resistance or reactance under cutting load without strain past the elastic limit of the metal (e.g., cold rolled steel) that the much larger one-piece spring member a has been found to accomplish.

In the diagram, FIG. 2, B' represents the preferred average initial cutting position of the cutter blade assembly B, FIGS. 1 and 4, which is comparable to the attitude of a knife one uses in cutting bread (slicing attitude), such being much more effectual than if the blade assembly is adjusted to project initially at a right angle to the direction of movement of the boat. Position B2 is such as obtains, temporarily only, under emergency loading, as when a submerged post is encountered by the blade; and position B3 is such as occurs when the boat is driven in reverse.

For adjustment of the desired initial cutting angle (horizontally) of the blade assembly B, the flange 22a, FIGS. 3 and 4, of collar 22 has an arcuate slot 65 of approximately 90° extent and the flange 34a of cap piece 34 has a series of closely spaced threaded openings 66 vertically aligned with the slot 65. Stud or bolt 68 is shouldered or is otherwise designed so that tightening of the bolt 68 cannot clamp together the flanges 22a and 34a in a manner to prevent free angular movement of the torque shaft assembly T when the boat is backed up. The stud or bolt 68 is set to occupy whichever opening 66 will result in initially positioning the blade assembly B at the desired attitude (e.g., position B' FIG. 2) in reference to the weed growths to be cut, and with the stud or bolt 68 abutting one end of the arcuate slot 65. As the cutting load increases, flexure of the torque rod assembly T permits the blade assembly to move toward position B2, FIG. 2, as much as necessary in order to avoid obstruction to forward movement. When the boat is driven in reverse, as in making turns the screw or bolt 68 traverses the slot 65 freely and enables the blade assembly to "trail" forwardly as at B3, FIG. 2, and then permits return of the blade assembly freely to the cutting position B' when forward boat movement is resumed.

In order to hold the tube C in properly elevated position the base tube 1, as shown by FIG. 5, is preferably constructed so as to constitute a clamp for the tube C. A screw 70 having a hand-wheel 71, and a manipulating arm or pin 72 if desired, enables frictional gripping of the tube C by the casing 1. During normal weed-cutting operations the clamp screw 70 is released; and then a fast-acting rack-and-pinion (elevator) mechanism E. FIG. 4, assumes control of the cutting position of the cutter blade assembly B, vertically.

As shown by FIGS. 1, 4 and 5, the elevator mechanism, E comprises a rack 55 fixed, e.g., full length to the tube C (as by positional pinning plus tack welding for example); and rack 55 (see FIGS. 1, 4 and 5) occupies a longitudinally extending channel or guide portion 56 of the tubular base casing 1. An operating pinion 57 is mounted in a boss portion 56' of the channel portion 56 as shown by comparison of FIGS. 1 and 4, and (in order not to conflict with or to be out of the way of other necessary operations) an operating crank 58 for the pinion 57 is mounted obliquely of the general assembly (as shown in FIG. 1) on a bracket 59 rigidly attached to the circular plate 8. The crank 58 is shown as connected to the supporting shaft of the pinion 57 by a conventional gimbal joint 60 or equivalent "universal" joint not shown.

Since the mass or weight of the cutter blade assembly B; tube C, etc., is normally sufficient to hold the movable parts of the cutter unit in maximum lowered position it is ordinarily only necessary, prior to commencement of cutting operations, to block lowering movement of the cutter blade assembly B at the desired cutting elevation. As shown by FIGS. 1 and 4 a readily releasable pawl 62 is normally in engagement with a selected tooth of the rack 55 to prevent lowering of the tube C, hence cutter blade assembly B, beyond the desired elevations. The clamp mechanism shown in FIG. 5 augments the pawl 62; and functions principally for emergency control or steadying of the descent of the tube C and the cutter blade assembly, which otherwise might sometimes descend too rapidly or descend farther than necessary.

We claim:

1. An underwater, weed, cutting unit including a tubular casing adapted to be secured in generally upright position on the hull or body of a power boat or other vessel having a normal forward direction of movement, means securing the casing in such position against angular movement about its longitudinal axis, shaft means in the casing, guided thereby for angular movement of at least a lower portion thereof about said axis, the shaft means including a flexible torsion rod or spring portion thereof, a scythe-type cutter blade secured to a lower end portion of the shaft means for cutting operation as described, and means securing an upper end portion of the shaft means in a position such that the cutter blade extends at a desired initial cutting angle transversely of said direction of movement of the vessel and can swing therefrom toward various generally trailing cutting positions under load.

2. The unit according to claim 1, wherein the securing means for the upper end portion of the shaft means includes an adjusting means capable of enabling selection of various initial (unloaded) positions of the cutter blade relative to such normal forward direction of movement of the boat or vessel.

3. The unit according to claim 1 wherein the flexible portion of the shaft means includes at least one generally flat, leaf spring-like section and substantially nonflexible or rigid sections at each end thereof held approximately in axial alignment by guiding contact with respective inner wall surface portions of the tubular casing.

4. The unit according to claim 1, wherein the torsionally flexible portion of the shaft means includes a plurality of generally flat, elongated, leaf spring-like portions of the shaft means, and substantially nonflexible or rigid alignment-establishing guide portions at each end of each leaf spring-like portion in telescoping relationship to respective inner wall surface portions of the tubular casing.

5. The unit according to claim 1, wherein the means securing the upper end portion of the shaft means includes one-way acting abutment means enabling the blade to move freely forwardly of said normal direction of movement of the vessel, whenever the vessel moves generally rearwardly.

6. The unit according to claim 5, wherein the abutment means comprises a pin or equivalent designed to move freely into various positions along a slot or guideway in the casing extending coaxially thereof, the pin having means to lock it in a variety of positions about said axis to a portion of the shaft means.

7. An underwater, weed cutter unit assembly including a tubular casing adapted to be secured in generally upright position, as alongside a boat hull, resiliently opposed means guided in the casing for angular movement about the axis of the casing, a scythe-type cutter blade secured to said means so as normally to project horizontally and laterally of the casing, means pivotally connecting the casing to the hull on a generally horizontal fore-and-aft axis, and an adjustable jack device interposed between the casing and the hull to enable the blade to lie at various elevations generally parallel to varyingly inclined shore bottoms.

8. The unit assembly according to claim 7, wherein the jack device comprises elongated, right and left hand screw-threaded elements, respectively connected (a) to a pad or shoe device adapted to rest against the boat hull and (b) to the casing; and an angularly adjustable internally threaded sleeve matingly embracing said elements.

9. An underwater, weed cutting mechanism, wherein a main supporting tubular base is adapted to be secured to a boat hull or the like in generally upright position, cutter means including a shaft in a supporting tube telescopingly embraced by the base, and a generally horizontally extending scythe-type cutter blade on the lower end of the shaft, and means to adjust the depth of operation of the cutter blade, said means comprising a toothed rack on the supporting tube, a pinion on the base engaging the rack, and rotary means connected to the pinion to turn it in a direction to raise the cutting position of the blade.

10. The mechanism according to claim 9, including a pawl on the base normally biased to engage the rack and prevent lowering movement of the cutter blade.

11. The mechanism according to claim 9, wherein the tubular base has a longitudinally extending split portion and associated means constituting a clamp operable frictionally to hold the supporting tube in variously elevated positions.

References Cited

UNITED STATES PATENTS

| | | | |
|---|---|---|---|
| 223,521 | 1/1880 | Lane | 55—8 |
| 1,269,139 | 6/1918 | Welch | 56—8 |
| 1,611,778 | 12/1926 | Rathke | 56—8 |
| 2,214,162 | 9/1940 | Clapper | 56—25 |
| 2,741,080 | 4/1956 | Haire | 56—8 |
| 2,949,003 | 8/1960 | Wilcox | 56—8 |

RUSSELL R. KINSEY, Primary Examiner

U.S. Cl. X.R.

56—25